Nov. 9, 1965 W. F. STILLMAN 3,216,164
SEAL
Filed Oct. 8, 1962
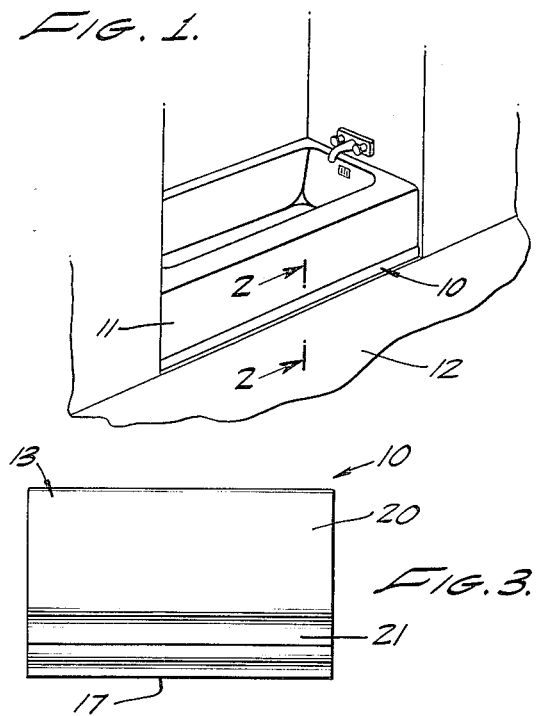
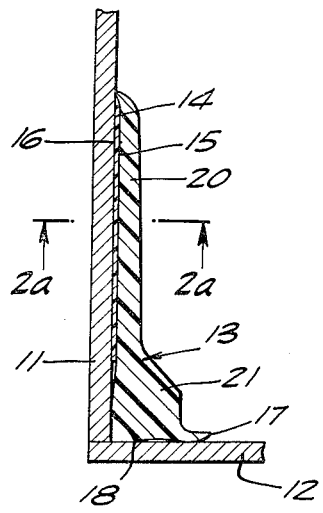
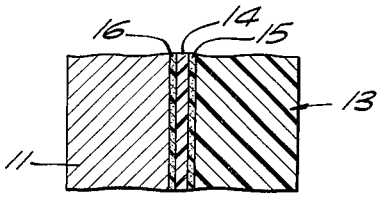
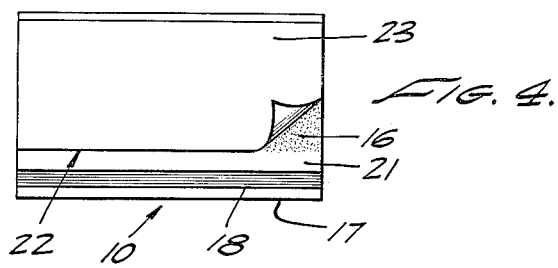
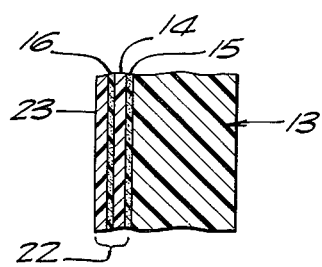
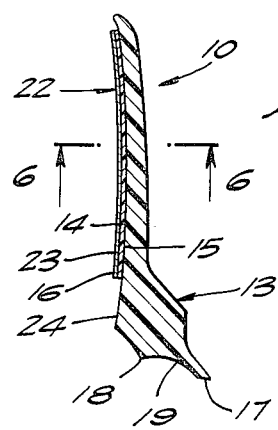
WILLIAM FREDERICK STILLMAN
INVENTOR.
KENDRICK AND STOLZY
BY
ATTORNEYS

United States Patent Office 3,216,164
Patented Nov. 9, 1965

3,216,164
SEAL
William Frederick Stillman, 925 North Ave. 67,
Los Angeles, Calif.
Filed Oct. 8, 1962, Ser. No. 229,089
2 Claims. (Cl. 52—309)

This invention relates to the art of providing liquid-tight seals, and more particularly to an efficient sealing device which may be easily and quickly applied to cover a crack or the like between two structures.

Although the device of the present invention may have a much larger scope of application and therefore should not be limited to the specific uses suggested herein, its employment has been found to be especially advantageous around bathtubs and the like in lieu of a caulking compound which is otherwise normally used to seal off the space between the bathtub and a surrounding floor surface of linoleum or ceramic tile.

The disadvantages of using a caulking compound for such a purpose are old and well known. The same is difficult to apply and its application takes a considerable amount of time. Its appearance is unsightly regardless of wheather or not it is applied in an expert manner. Its surface ages very rapidly and cracks develop in it which collect dirt that makes the caulking still more unsightly. Further, cracks often develop rapidly through the entire thickness of the caulking and the same thereby causes a complete failure of its principal function, namely to make the crevice in which it has been placed water tight. Moreover, its replacement is a time consuming task in that the aged caulking must be retrieved from the crevice before a fresh supply is applied to it.

According to the present invention, the above-described and other disadvantages of the prior art are overcome by providing a sealing device including a body having a sealing side, and means to hold the body in a fixed position relative to a first surface, whereby the sealing side may sealingly engage a second surface adjacent the first surface.

In accordance with a feature of the present invention, a tape is provided with a pressure sensitive adhesive on each of two sides thereof. One side of the tape is normally provided with a covering tape to prevent it from sticking to itself in a roll. The adhesive tape is then unrolled and applied to the body. Thus, the body may be applied to a bathtub or the like simply by removing the adhesive tape cover and pressing the adhesive tape and the body against the side of the tub while pressing the sealing side of the body against the floor of the bathroom.

Note will be taken that in accordance with the present invention, the body may be easily and quickly applied to a bathtub. It is pleasing in appearance in that the body may be an extruded vinyl molding. The body need not be applied in an expert manner. That is, by being easily applied to the bathtub, it will have a pleasing appearance even though little or no skill is necessary in applying the same.

The vinyl is not easily attacked by water and does not age rapidly for any other reason. Its surface does not crack and thereby become soiled and unsightly for that reason. Furthermore, the vinyl body may be easily and quickly replaced simply by pulling a used body from the tub and applying another.

In the past, it has been the practice to apply plastic moldings to a wall adjacent a floor by the use of a viscous liquid cement which requires some time to set. In accordance with the present invention, a bonded molding is provided. However, the bottom edge of the molding or body seals to the floor of the bathroom. Hence, it would be an extremely difficult and time consuming task to apply the body of the present invention to a bathtub with a viscous liquid cement. In particular, the bottom edge of the body is resilient and force must be applied in a vertical direction on the body to cause the seal to the bathroom floor. If a viscous liquid cement were employed, the resilient character of the bottom edge of the body would tend to move the body up, the character of the viscous liquid cement surface acting as a lubricant rather than a bond for the body prior to the time that the cement dries. The time consuming task of applying a viscous liquid cement and its inherent lubricating disadvantage are obviated in accordance with the present invention by employing the pressure sensitive adhesive tape which bonds immediately to the bathtub upon the application of pressure thereto. Hence, the sealing edge of the body may be held in pressure contact with the bathroom floor and the pressure sensitive adhesive tape attached to the body pressed against the bathtub to hold the sealing edge thereof continuously in pressure contact with the bathroom floor from the precise moment it is held thereagainst. That is, the pressure sensitive adhesive will not permit the body to slip upwardly along the side of the bathtub and relieve the pressure on the sealing edge thereof.

According to another outstanding feature of the present invention, a sealing device is provided including the body and means to hold it against a bathtub for example, the body including a longitudinal resilient lip and a parallel spaced longitudinal resilient rib defining a recess therebetween at the sealing side of the body. According to this feature of the present invention, a double seal is provided at the floor of the bathroom adjacent the tub to prevent water from being driven between the sealing side of the body and the floor to the juncture of the bathtub and the floor.

The above-described and other advantages of the present invention will be better understood from the following description when considered in connection with the accompanying drawings.

In the drawings which are to be regarded as merely illustrative:

FIG. 1 is a perspective view of a bathtub and a bathroom floor having the sealing device of the present invention applied therebetween;

FIG. 2 is a broken away sectional view of the device taken on the line 2—2 shown in FIG. 1;

FIG. 2a is a greatly enlarged sectional view taken on the line 2a—2a shown in FIG. 2;

FIG. 3 is a front elevational view of a section of the sealing device of the present invention;

FIG. 4 is a rear elevational view of a section of the sealing device of the present invention prior to the time that it is applied to the bathtub;

FIG. 5 is a right end, greatly enlarged elevation view of the portion of the device shown in FIG. 4; and FIG. 6 is a still further enlarged sectional view of the device taken on the line 6—6 shown in FIG. 5.

In FIG. 1, the device of the present invention is indicated generally at 10, the same having been applied to a bathtub 11 to seal off the juncture between the same and a bathroom floor 12. The device 10 is again shown in FIG. 2 with tub 11 and floor 12, the device 10 including an extruded vinyl body 13 having a vinyl tape 14 bonded thereto by a pressure sensitive adhesive 15. On the side of tape 14, opposite the side at which adhesive 15 is provided, another layer of a pressure sensitive adhesive 16 is provided to bond tape 14 to tub 11.

Note will be taken from both FIGS. 2 and 5 that body 13 is provided with a lip at 17 and a rib at 18 defining a recess 19 therebetween. Lip 17 and rib 18 both engage floor 12. Body 13 is provided with a thinner portion at 20 and a thicker portion at 21.

As shown in FIGS. 4 and 5, the device 10, before it is applied to tub 11, is provided with a bonding structure 22 which includes not only tape 14 and adhesive layers 15 and 16, but also a covering layer 23 for adhesive layer 16.

The sealing device 10 of the present invention as shown in FIG. 5 may be manufactured by extruding body 13 and applying bonding structure in the form of a tape having all the layers 14, 15, 16 and 23 to a rear surface 24 of body 13 as shown in FIG. 5. In accordance with a feature of the invention of this manufacturing process, preferably a pair of light pressure feed rolls and a pair of heavy pressure bonding rolls are provided whereby body 13 is not stretched longitudinally when bonding structure 22 is attached thereto.

Bonding structure 22 of course is conventional. In this regard, it is conventional to employ a vinyl tape 14 of conventional composition. It is another feature of the present invention that the composition of body 13 is made similar to the composition of tape 14, whereby the layer of pressure sensitive adhesive 15 will not react with the plasticizers in vinyl body 13.

After the sealing device 10 has been manufactured, it is applied to tub 11 by peeling cover 23 back, holding lip 17 and rib 18 in pressure contact with floor 12, and placing body 13 against tub 11 to cause adhesive 16 to bond to tub 11 while lip 17 and rib 18 are held in pressure contact with floor 12.

In accordance with the present invention, the use of the pressure sensitive adhesive at 15 and 16 makes the manufacture and use of the sealing device 10 unusually efficient. Both may be performed easily and in a relatively short time. The appearance of body 13 is unusually pleasing and the same does not age rapidly. Its replacement may be made easily and quickly, and the use of a pressure sensitive adhesive at 16 makes it possible to hold lip 17 and rib 18 in pressure contact with floor 12 immediately upon the bonding of tape 14 to tub 11 by adhesive 16, which bonding occurs instantaneously upon the application of pressure to body 13. Still further, the use of lip 17 and rib 18 provides a double seal with floor 12 to prevent water from being driven into the juncture between tub 11 and floor 12.

Although only one specific embodiment of the invention has been described and illustrated, many changes and modifications thereof will, of course, suggest themselves to those skilled in the art. The invention is therefore not to be limited to the embodiment selected for this disclosure, the true scope thereof being defined only in the appended claims.

What is claimed is:

1. A sealing device comprising: a first flexible resilient strip, said strip having a longitudinal resilient lip and a parallel spaced longtudinal resilient rib defining a recess therebetween, said lip and rib being located on one edge of said first strip; and a second strip of flexible material having one side bonded to one side of said first strip by a pressure sensitive adhesive, the other side of said second strip also having a pressure sensitive adhesive thereon, whereby said one side of said first strip may be held fixed relative to a first surface by said adhesive on said other side of said second strip immediately upon contact therewith and said first strip edge including said lip and said rib, at the same time, may be held in sealing pressure contact with a second surface positioned approximately at a right angle relative to said first surface.

2. A molding comprising: a resilient, flexible vinyl extrusion, and a vinyl tape of rectangular cross section having one side adhered to one side of said extrusion by a pressure sensitive adhesive, said extrusion and said tape having uniform cross sections along their lengths, said extrusion having an unstressed concave surface on said one side thereof, said tape having a width less than that of said concave surface whereby the upper edge of said extrusion may resiliently contact and seal with another surface to which the other side of said tape is adhered, said other side of said tape having a pressure sensitive adhesive thereon, the lower edge of said extrusion terminating in a relatively thin, flexible, resilient lip which extends downwardly away from said concave surface, said extrusion having a relatively thin, flexible, resilient rib on the bottom thereof spaced upwardly from the bottom edge of said lip, said extrusion having a concave recess in the bottom thereof between said lip and said rib effectively to provide a suction cup to hold the bottom of said extrusion tightly against a surface in contact with said lip and said rib.

References Cited by the Examiner
UNITED STATES PATENTS

| | | | |
|---|---|---|---|
| 891,652 | 6/00 | Akre | 20—69 |
| 1,728,660 | 9/29 | Burdine | 20—69 |
| 2,867,859 | 1/59 | Brink et al. | 20—52.8 |

LEWIS J. LENNY, *Primary Examiner.*

EDWARD V. BENHAM, *Examiner.*